US009566891B2

(12) United States Patent
Neufeld et al.

(10) Patent No.: US 9,566,891 B2
(45) Date of Patent: Feb. 14, 2017

(54) SEED TENDER WITH INTERCHANGEABLE CONVEYORS

(71) Applicant: MERIDIAN MANUFACTURING, INC., Winnipeg (CA)

(72) Inventors: Juan Neufeld, Winkler (CA); Jeffrey Paul Grindle, Carroll, IA (US)

(73) Assignee: Meridian Manufacturing, Inc., Winnipeg (CA)

( * ) Notice: Subject to any disclaimer, the term of this patent is extended or adjusted under 35 U.S.C. 154(b) by 0 days.

(21) Appl. No.: 14/616,183

(22) Filed: Feb. 6, 2015

(65) Prior Publication Data
US 2016/0229327 A1 Aug. 11, 2016

(51) Int. Cl.
*B60P 1/36* (2006.01)
*B60P 1/40* (2006.01)

(52) U.S. Cl.
CPC ... *B60P 1/36* (2013.01); *B60P 1/40* (2013.01)

(58) Field of Classification Search
CPC .......... B60P 1/36; B60P 1/40; A01D 41/1217; A01D 490/10
USPC ........................................................ 414/523
See application file for complete search history.

(56) References Cited

U.S. PATENT DOCUMENTS

| 3,770,253 | A | * | 11/1973 | Arndt | B60P 3/00 198/538 |
| 4,411,581 | A | * | 10/1983 | Niewold | B65G 41/002 222/163 |
| 5,516,253 | A | * | 5/1996 | Linscheid | B60P 1/42 198/313 |
| 5,888,044 | A | * | 3/1999 | Baskerville | B60P 1/42 198/311 |
| 6,209,880 | B1 | * | 4/2001 | Turnwald | B60P 1/42 198/671 |
| 6,464,426 | B1 | * | 10/2002 | Girouard | B60P 1/36 404/101 |
| 7,971,702 | B2 | * | 7/2011 | Johnsgaard | B65G 65/46 198/550.1 |
| 8,221,047 | B2 | * | 7/2012 | Petersen | A01C 15/003 198/312 |
| 8,702,368 | B2 | * | 4/2014 | Van Mill | B60P 1/42 198/318 |
| 8,770,390 | B2 | * | 7/2014 | Neufeld | B65G 21/14 198/812 |
| 8,931,995 | B2 | * | 1/2015 | Fitzgerald | A01C 7/208 177/136 |
| 2005/0238469 | A1 | * | 10/2005 | Cresswell | A01C 15/006 414/523 |
| 2007/0264112 | A1 | * | 11/2007 | Francis | B60P 1/42 414/523 |

(Continued)

*Primary Examiner* — Kaitlin Joerger
(74) *Attorney, Agent, or Firm* — McKee, Voorhees & Sease, PLC

(57) ABSTRACT

A belt conveyor and an auger conveyor are interchangeably mountable on a seed cart or tender. A mounting bracket slidably receives the lower end of the selected conveyor, which is hooked into position at the lower end of the bracket. A removable pin is inserted through the upper end of the bracket and the conveyor to retain the conveyor on the mounting bracket. The mounting bracket can be moved on a carriage along tracks on the frame of the seed cart or tender to position the inlet of the conveyor to receive seeds from bulk seed boxes or a hopper. The conveyor can be rotated to an infinite number of positions along a 180° radius to discharge seed in a desired location.

18 Claims, 4 Drawing Sheets

(56) References Cited

U.S. PATENT DOCUMENTS

2015/0237804 A1\* 8/2015 Van Mill .................. B60P 1/42
414/523

\* cited by examiner

US 9,566,891 B2

SEED TENDER WITH INTERCHANGEABLE CONVEYORS

FIELD OF THE INVENTION

The invention relates to an improved agricultural seed cart having interchangeable belt and auger conveyors for selective use, depending upon the seed or grain being handled and/or farmer's needs.

BACKGROUND OF THE INVENTION

Seed cards and seed tenders are well-known in the agricultural industry for transporting seed and grain to and from the field. There are two primary styles of seed carts and seed tenders, both of which have a container for seeds. A bulk seed tender typically includes a trailer with a framework for supporting one or more bulk seed boxes or bags. The bulk seed boxes/bags are filled by the seed supplier, mounted on the trailer frame, and transported to the field to fill seed planters in the Spring. A seed cart includes a trailer or wheeled frame with a larger seed hopper supported by legs on the trailer or frame. While the bulk seed boxes/bags are not typically used in the Fall for harvest, a seed cart with the hopper can be used in the Spring to fill planters with seed, and it can be used in the Fall to receive seed from a combine.

Both the bulk seed box or bag and the seed cart hopper have seed outlets in communication with a chute to direct the seed into a conveyor, which carries the seed to a planter or carries the harvested grain for discharge into a truck or other container. The conveyors are either a belt-type conveyor or an auger-type conveyor. Belt conveyors are generally less aggressive and better suited than an auger conveyors for handling seed with minimal damage to the seed. Since seed is expensive, due to the addition of herbicides and pesticides, and other treatments such as genetic modification, it is desirable to maintain the integrity of the seeds. Therefore, it is generally preferable to use a belt conveyor in the Spring for transporting seed. In comparison, auger conveyors are generally more aggressive, but can handle a higher volume. Since the integrity of the harvested grain is not as critical as the integrity of Spring seeds, augers may be used in the Fall for the grain transport.

Prior art seed carts and tenders are manufactured using either a belt conveyor or an auger conveyor. Therefore, if a farmer wants the benefits of each type of conveyor, the farmer must have two carts or tenders, which adds significant costs to the farming operations.

Accordingly, a primary objective of the present invention is the provision of a seed cart or tender having interchangeable belt and auger conveyors.

Another objective of the present invention is the provision of a seed cart or seed tender for bulk seed containers and large seed hoppers which allow the farmer to exchange a belt conveyor and an auger conveyor for one another, as desired.

A further objective of the present invention is the provision of a seed cart or tender having a belt conveyor and an auger conveyor which slidably mount onto the frame for quick and easy substitution of one for the other.

Still another objective of the present invention is the provision of interchangeable belt and auger conveyors on a seed cart or seed tender, which can be quickly and easily mounted and dismounted.

Yet another objective of the present invention is the provision of a belt conveyor and auger conveyor which can be manually interchanged on a seed cart or seed tender without the use of lifting equipment.

Another objective of the present invention is the provision of a seed cart and seed tender having interchangeable conveyors which is economical to manufacturer, and durable and safe in use.

These and other objectives will become apparent from the following description of the invention.

SUMMARY OF THE INVENTION

The seed cart and seed tender of the present invention includes a frame to support a hopper or, alternatively, one or more bulk seed containers. The seed cart or tender includes a pair of conveyors, one being a belt conveyor and the other being an auger conveyor, which can be interchangeably mounted on the frame by the farmer for use as needed in the Spring and the Fall. The mounting assembly includes a bracket pivotally connected to the frame, with one or the other conveyors slidably received in the bracket. A pair of hooks on the bracket retentively engage opposing posts on the conveyor adjacent the inlet end of the conveyor. A pin is removably inserted through the bracket and conveyor housing or tube. Hydraulic and electrical lines can be connected to the belt or auger conveyor for operation. The bracket inclines the conveyor upwardly from the inlet end to the outlet end, and allows the conveyor to be pivoted approximately 180° relative to the front or rear ends of the seed cart or seed tender for discharge of seed or grain at a desired location.

DETAILED DESCRIPTION OF THE PREFERRED EMBODIMENTS

Figure 1:
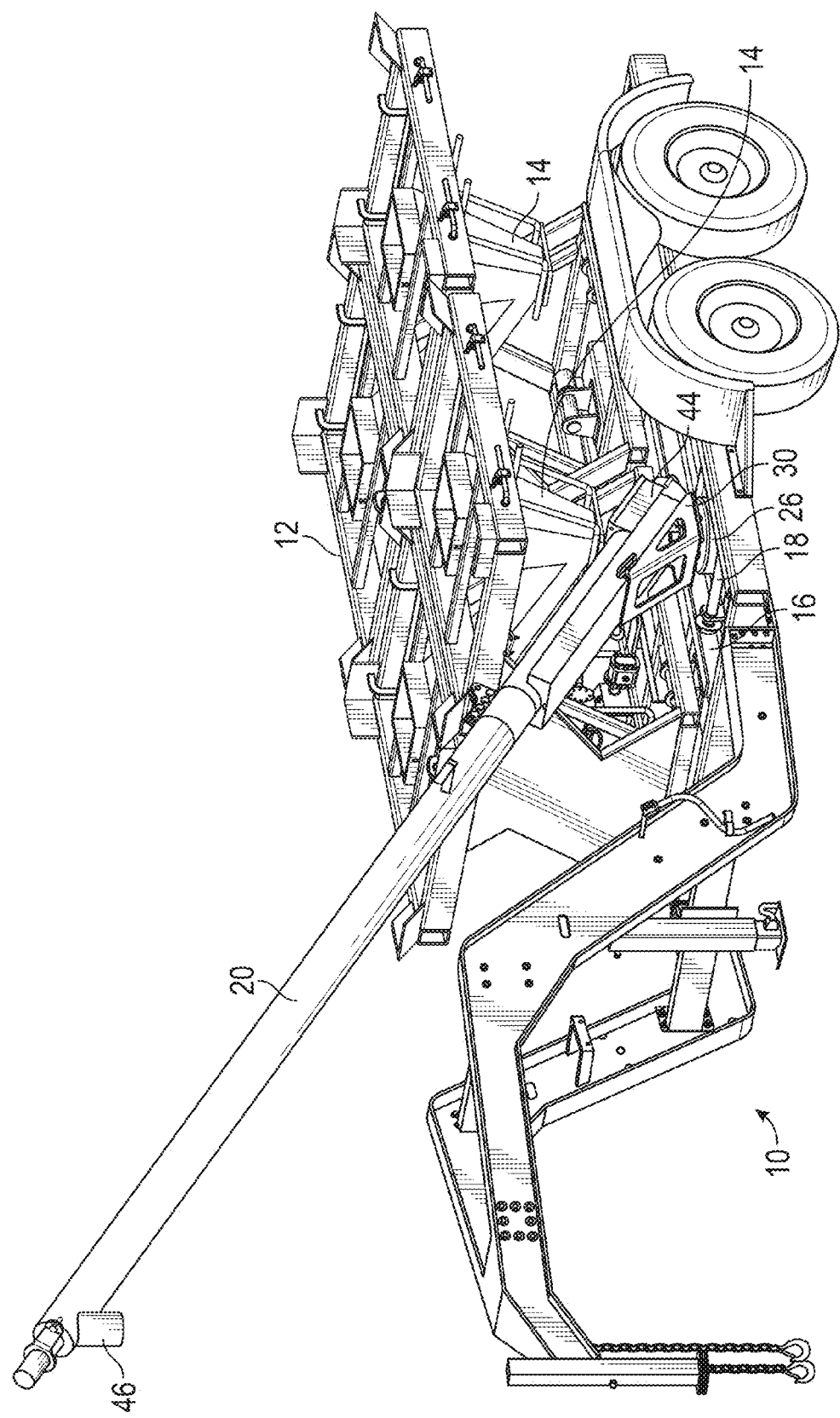
FIG. 1 is a perspective view of a seed trailer with the interchangeable conveyors according to the present invention.
Figure 2:
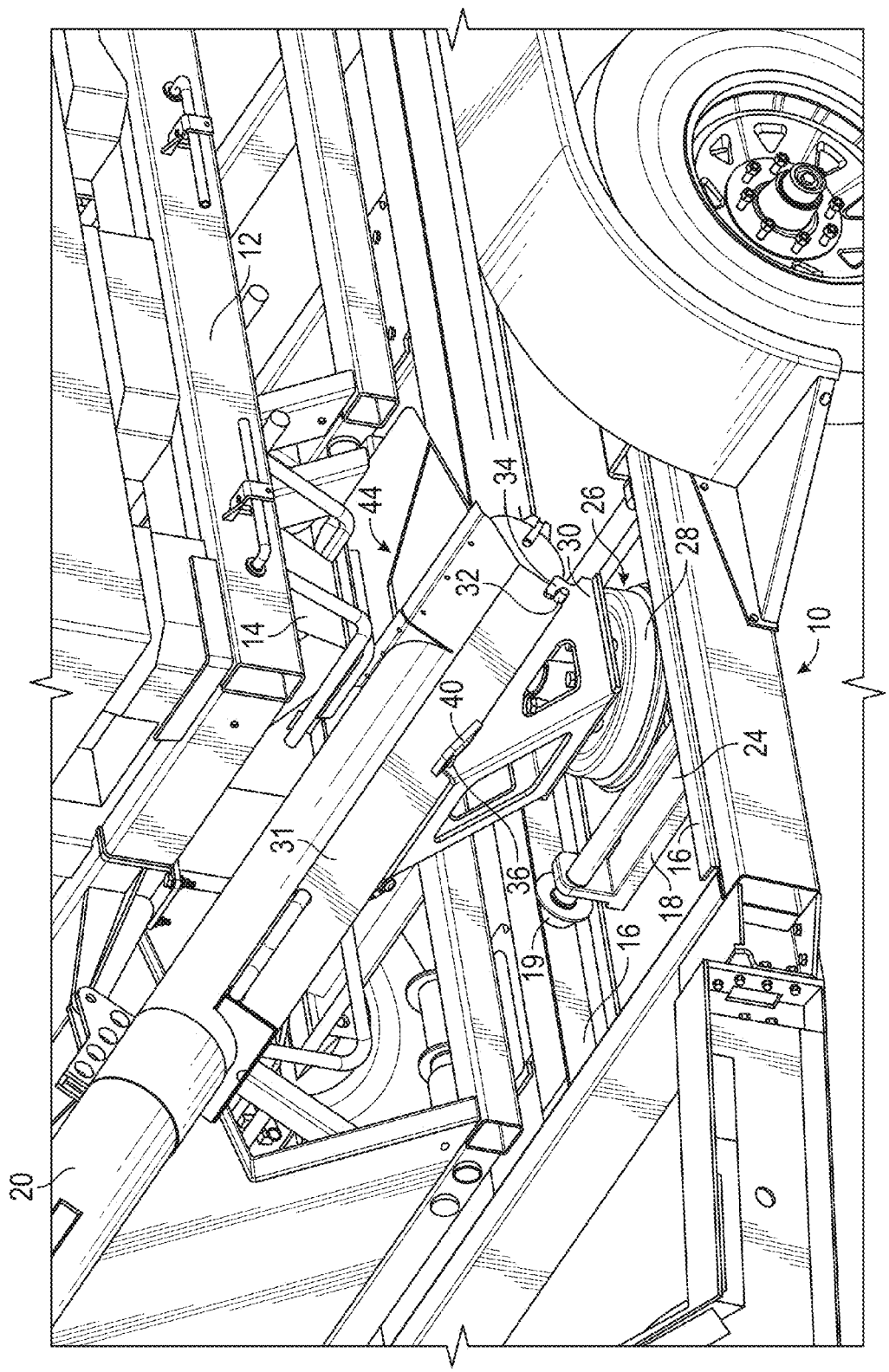
FIG. 2 is an enlarged, partial perspective view of the seed trailer having the interchangeable conveyors according to the present invention.

In FIG. 1, a bulk seed trailer is generally designated by the reference numeral 10. The trailer includes a frame 12 adapted to support bulk seed container boxes (not shown). The frame 12 shown in FIG. 1 can receive 1-4 bulk seed containers, though it is understood that the frame may be sized and configured to support any number of bulk seed container boxes. The bulk seed container boxes each include a bottom outlet for discharging seed into chutes 14 on the frame 12. The frame 12 also includes a track 16 with opposite sides formed with C-shaped channels. A carriage 18 with wheels or rollers 19 is mounted in the track 16 for rolling movement along the track.

The present invention is directed towards a pair of conveyors 20 which can be interchangeably mounted on the trailer 10. One of the conveyors 20 is a belt conveyor and the other is an auger conveyor. While the operating mechanics of the belt and auger conveyors are different, the assembly for mounting and dismounting the conveyors onto the trailer 10 is similar for both conveyors.

Figure 3:
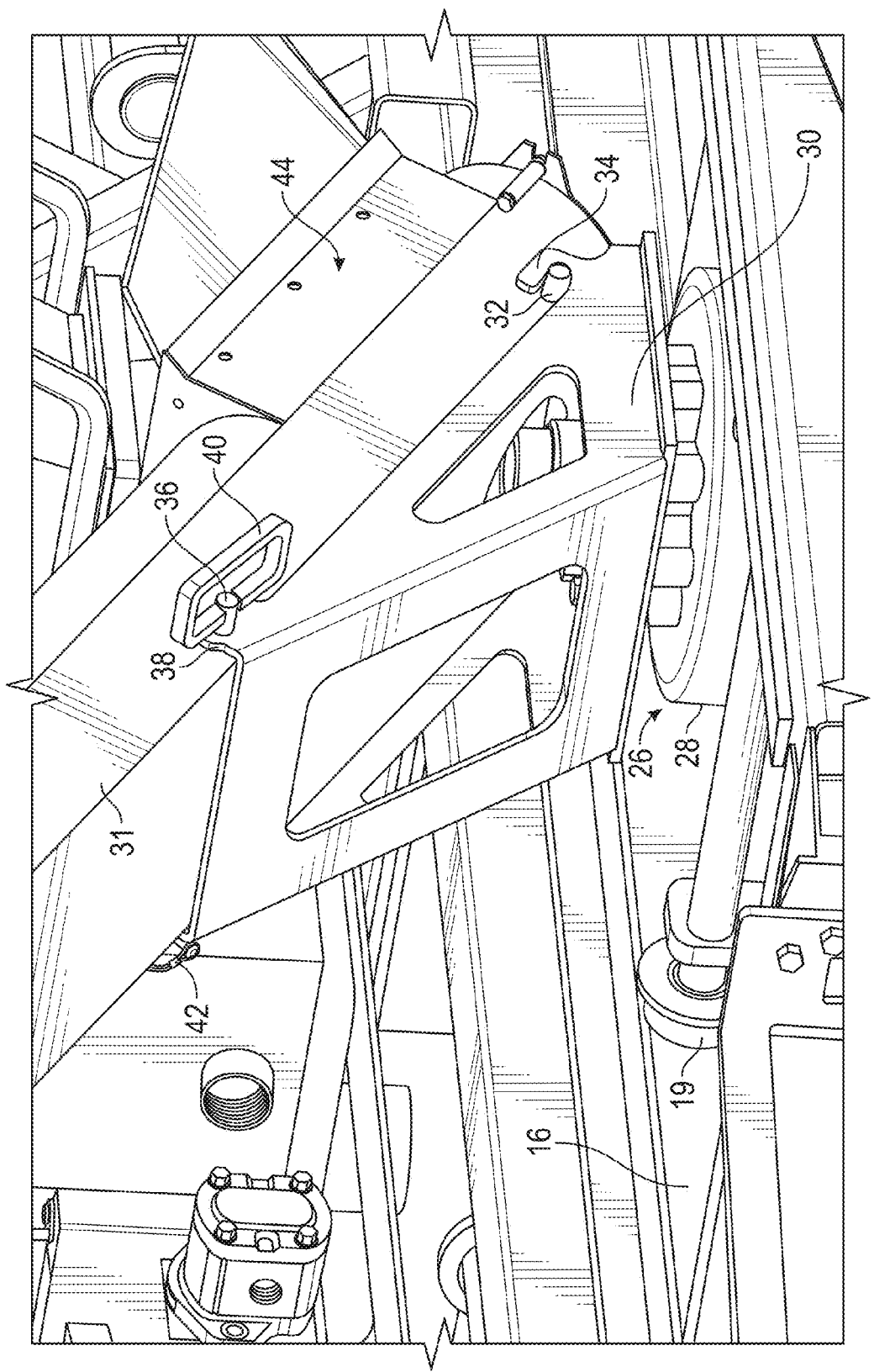
FIG. 3 is an enlarged perspective view of the conveyor mounting bracket and rotation assembly.
Figure 4:
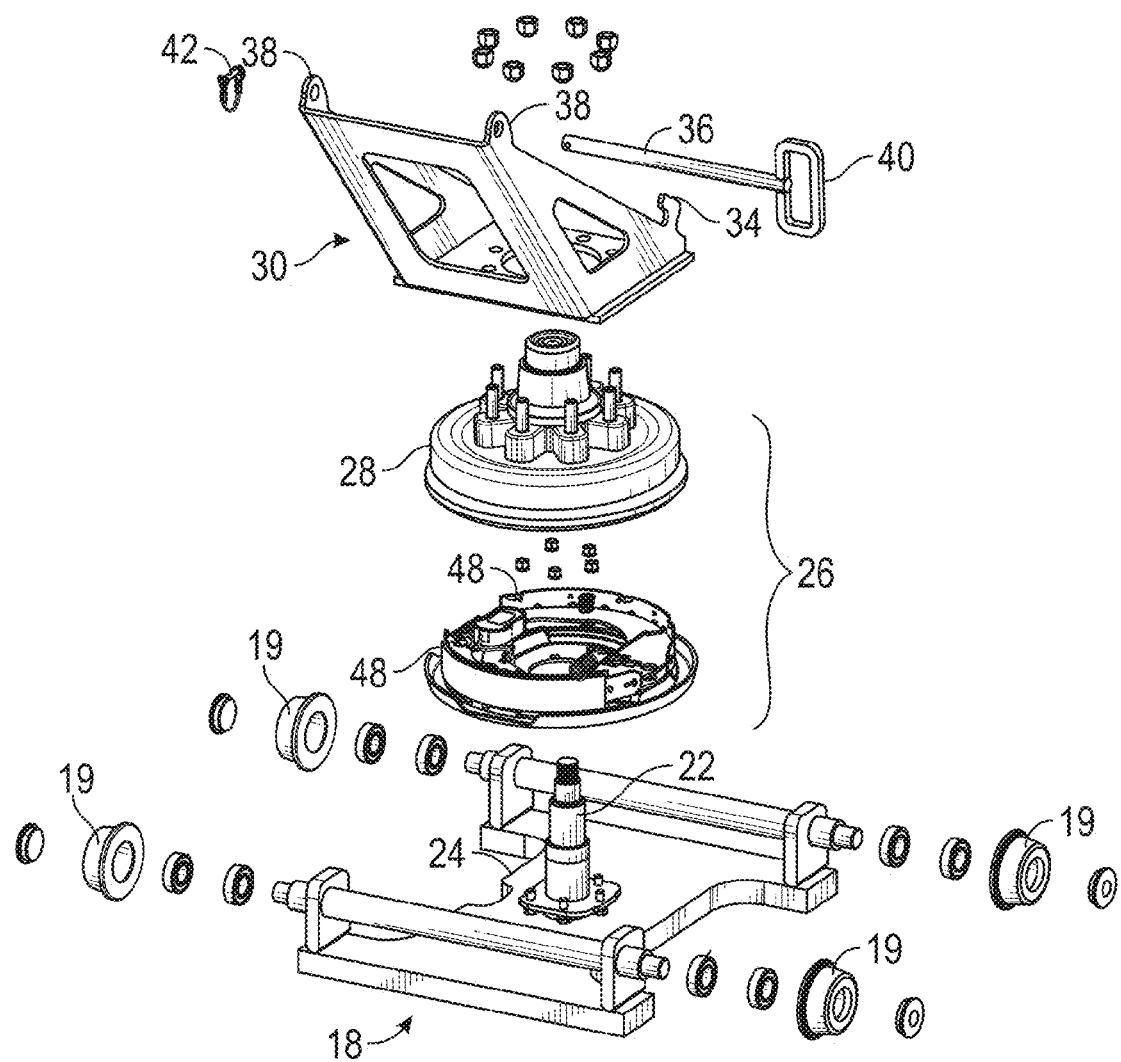
FIG. 4 is an exploded view of the bracket, spindle, and brake assembly.

More particularly, a spindle 22 is fixed to a plate 24 of the carriage 18, as seen in FIG. 3. A brake assembly 26 having an upper housing or drum 28 is rotatably mounted on the spindle 22. A mounting bracket 30 is bolted or otherwise secured to the housing 28 of the brake assembly 26 for rotation therewith.

The belt and auger conveyors 20 can be selectively exchanged on the bracket 30, depending upon the farmer's needs. More particularly, the lower end of each conveyor includes a pair of outwardly extending posts or stub shafts 32 which are slidably received within a pair of upstanding hooks 34 on opposite sides of the bracket 30. Thus, the hooks 34 retentively engage the posts 32. An elongated pin 36 extends through upstanding ears 38 and through the conveyor or housing or base 31 so as to further secure the conveyor 20 to the bracket 30. The pin 36 may include a handle 40 on one end for easy gripping and a releasable lock mechanism 42 on the opposite end to prevent accidental removal of the pin 36 from the conveyor 20 and the bracket 30.

The bracket 30 supports the conveyor 20 in an upwardly inclined, cantilevered position. The carriage 18 can be rolled along the track 16 so as to position the inlet 44 of the belt or auger conveyor beneath one of the chutes 14 to receive seed from the bulk seed container box or the hopper. The conveyor 20 can also be rotated on the spindle 22 via the bracket 30 and brake assembly 26 connection so that the outlet 46 of the conveyor can be positioned along a path extending substantially 180° between the front of the trailer 10 and the rear of the trailer 10. The brake assembly 26 includes electrically or mechanically actuated brake shoes 48 to lock the conveyor 20 in a selected rotational position. The rotational position is infinitely adjustable from approximately 0°-180°, as opposed to being limited to a plurality of preset angular orientations.

In use, a farmer can selectively interchange the belt and auger conveyors, as needed in the field. For example, a belt conveyor can be used in the Spring to deliver seed to planters, while an auger conveyor can be used in the Fall to quickly convey grain from the seed cart hopper to a truck or other container. Exchanging one conveyor for the other simply requires the disconnection of hydraulic and electrical couplings from the conveyor, and then pulling the pin 36 from the conveyor base 31 and bracket 30. The conveyor can then be manually slid upwardly so as to disengage the posts 32 from the hooks 34. The operation is reversed to mount the alternative conveyor, which is slid downwardly along the bracket 30 until the posts 32 are received in the hooks 34. Then the pin 36 is a reinserted through the bracket ears 38 and the conveyor base 31. Then the hydraulic and electrical lines can be reconnected to the substituted conveyor for operation.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A seed cart, comprising:
    a trailer;
    a seed container mounted on the trailer and having a seed outlet;
    a seed belt conveyor and a seed auger interchangeably mounted on the trailer;
    a bracket mounted on the trailer to selectively receive the belt conveyer and the auger;
    the bracket being pivotal about a vertical axis;
    the belt conveyor and the auger each having a lower end with an upwardly facing inlet to receive seed from the seed container; and
    the bracket being positioned under the belt conveyor and the auger to slidably receive the lower ends thereof.

2. The seed cart of claim 1 wherein the belt conveyor and auger are slidably mounted on the bracket.

3. The seed cart of claim 1 wherein the belt conveyor and auger are slidably mounted on top of the bracket.

4. The seed cart of claim 1 wherein the bracket has opposite sides each having a hook, and the belt conveyor and auger each have opposite sides with posts for retentive engagement in the hooks.

5. The seed cart of claim 1 wherein the belt conveyor and auger each have opposite inlet and outlet ends, and the bracket is adjacent the inlet ends when the belt conveyor or auger is mounted on the bracket.

6. The seed cart of claim 1 further comprising a pin removably extending through the bracket and the belt conveyor or auger to retain the conveyor or auger on the bracket.

7. The seed cart of claim 1 wherein the bracket has an inclined upper surface to support the belt conveyor and auger in an inclined position from the inlet end to the outlet end.

8. The seed cart of claim 1 wherein the container is a hopper.

9. The seed cart of claim 1 wherein the container is a bulk seed box.

10. An improved seed cart having a seed container, the improvement comprising:
    a support bracket rotatably mounted on the cart for rotation about a vertical axis;
    first and second conveyors interchangeably mounted on the bracket and exchangeable for one another for receiving seed from the container;
    the first and second conveyors are alternatively mounted adjacent their lower ends to the;
    the first conveyor is a belt and the second conveyor is an auger.

11. The improved seed cart of claim 10 wherein the first and second conveyors each have a lower end hooked to the bracket.

12. The improved seed cart of claim 10 wherein the first and second conveyors are pinned to the bracket.

13. The improved seed cart of claim 10 wherein the first and second conveyors are inclined upwardly from the bracket.

14. The improved seed cart of claim 10 wherein the first and second conveyors cantilever from the bracket.

15. The improved seed cart of claim 10 wherein the first and second conveyors are mounted on top of the bracket.

16. A method for using a seed cart in the spring and in the fall, the cart having a seed container comprising;
    slidably attaching a belt conveyor on top of a bracket mounted on the cart in the spring to handle seed to be planted;
    detaching the belt conveyor from the cart after planting;
    slidably attaching an auger on top of the bracket on the cart in the fall to handle harvested gain;
    detaching the auger from the cart after harvest.

17. A seed cart, comprising:
    a trailer;
    a seed container mounted on the trailer and having a seed outlet;
    a seed belt conveyor and a seed auger interchangeably mounted on the trailer;

a bracket mounted on the trailer to selectively receive the belt conveyer and the auger;

the bracket being pivotal about a vertical axis;

the belt conveyor and the auger each having a lower end with an upwardly facing inlet to receive seed from the seed container;

the bracket being positioned under the belt conveyor and the auger adjacent the lower ends thereof; and the bracket having opposite sides each having a hook, and the belt conveyor and auger each have opposite sides with posts for retentive engagement in the hooks.

18. A seed cart, comprising:

a trailer;

a seed container mounted on the trailer and having a seed outlet;

a seed belt conveyor and a seed auger interchangeably mounted on the trailer;

a bracket mounted on the trailer to selectively receive the belt conveyer and the auger;

the bracket being pivotal about a vertical axis;

the belt conveyor and the auger each having a lower end with an upwardly facing inlet to receive seed from the seed container;

the bracket being positioned under the belt conveyor and the auger adjacent the lower ends thereof; and a pin removably extending through the bracket and the belt conveyor or auger to retain the conveyor or auger on the bracket.

\* \* \* \* \*